Feb. 22, 1938.  E. J. MASTNEY  2,109,319
SWITCH
Filed Aug. 18, 1937
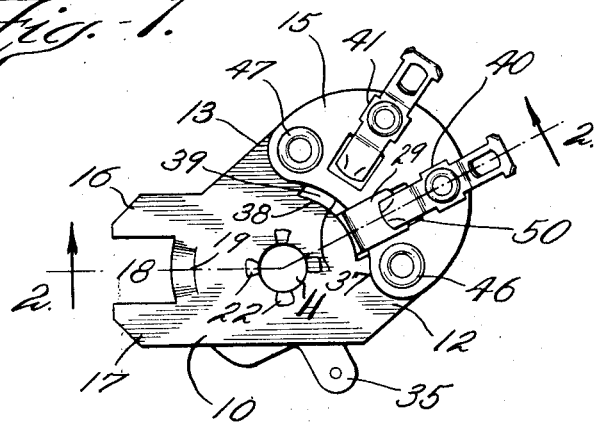
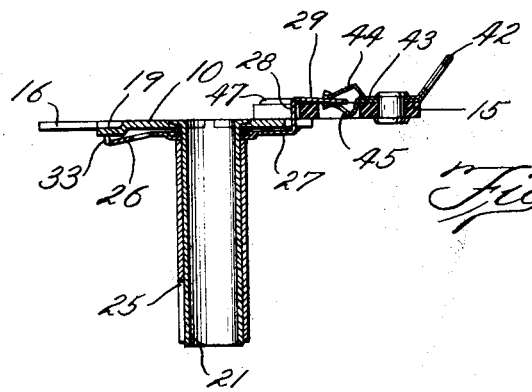
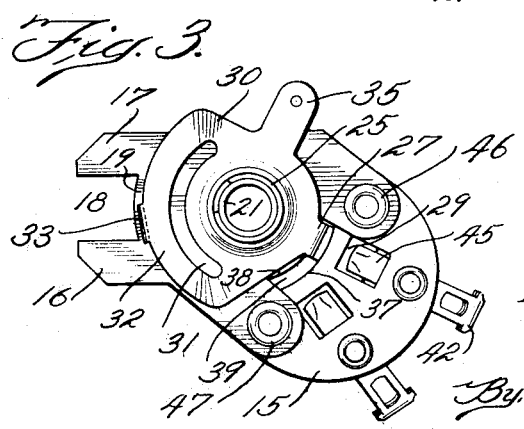
Inventor:
Edward J. Mastney.
By Robert L. Kahn Atty.

Patented Feb. 22, 1938

2,109,319

UNITED STATES PATENT OFFICE 2,109,319

SWITCH

Edward J. Mastney, Berwyn, Ill., assignor to Oak Manufacturing Company, Chicago, Ill., a corporation of Illinois Application August 18, 1937, Serial No. 159,685

12 Claims. (Cl. 200—11)

This invention relates to a switch. In the case of small switches for radios and the like, it has been customary to lock the shaft and rotor in a bushing by means of a C washer to prevent the shaft from pulling out. In some simple switches it is desirable to eliminate this. Particularly in the case of a switch having a hollow shaft through which a different operating shaft is threaded, it is necessary to eliminate the C washer since there is not enough thickness of metal to accommodate the same.

Referring to the drawing:

Figure 1 is a top view of a new switch.

Figure 2 is a section on line 2—2.

Figure 3 is a bottom view of the switch.

A metal base plate 10 is provided with an aperture 11 and a pair of ears 12 and 13 upon which an insulating stator 15 is mounted. Plate 10 is also provided with a pair of fingers 16 and 17 forming between them a slot 18 having an index indentation 19 at the base of the slot. A stationary shaft sleeve 21 preferably of metal, such as brass, is disposed in aperture 11 of plate 10 in any suitable fashion so that the two form a rigid unitary construction. As shown here, the sleeve has a plurality of projections 22 staked into the metal of plate 10 so as to form a smooth lock.

Rotatably disposed around shaft sleeve 21 is a second sleeve 25 which carries at one end a spring metal member 26 having one portion 27 formed as a rotor contact. Opposed to the rotor contact 27 is an arcuate section 30 having an arcuate slot 31 to leave a spring portion 32 provided at the center thereof with an index finger 33 bent upwardly therefrom. A grounding finger 35 is also formed out of spring plate 26. Rotor 27 has a vertical portion 28 as seen in Figure 2, and a substantially horizontal contact making portion 29, the entire contact having a general Z shape. Actually, as the drawing clearly shows, contacting portion 29 is bent downwardly slightly so that only the extreme tip tends to dig into stator 15.

Stator 15 which is of any suitable insulating material and may be of any desired shape, has its inner edge 37 spaced from the opposed edge 38 of plate 10 to leave an arcuate slot 39 within which the rotor contact is adapted to travel. Stator 15 carries a plurality of contacts, here shown as two, 40 and 41, each having a doubled over soldering tail 42, a mounting portion 43 and a pair of opposed contact making jaws 44 and 45. As shown in Figure 2, the jaws are oppositely bent toward each other and have the side edges bent away from each other at 45 in order to promote the entrance of the contact making portion 29 between the opposed jaws. The stator contacts are mounted by any suitable means, such as eyelets 46, on the arc of a circle concentric with aperture 11. The entire stator 15 is mounted on plate 10 by means of eyelets 46 and 47 passing through parts 12 and 13 of the plate. It is clear that the stator must be mounted last, since it is necessary to thread rotor contact 27 above stator 15, as viewed in Figure 2, prior to assembly.

Any suitable means may be used to turn outer sleeve 25 with respect to inner sleeve 21 and cause the switch to change its position. In order to prevent the entire switch from turning, the ears 16 and 17 may be used as the locking means against any suitable projection in a mounting panel. By suitably proportioning the index finger and the rotor contact it is possible to retain outer sleeve 25 rigidly in position. It will be noted that stator 15 is provided with a plurality of apertures 50 into which the lower jaw 45 of the stator contacts is adapted to be disposed. Furthermore, rotor contact portion 29 is wider than any of slots 50 in the stator, so that at all times there is some stator material to support the downward thrust of the rotor contact making portion 29. The various parts are so proportioned that the natural spring of contact making portion 29 tends to press itself against the stator when the index finger 33 is in any rest position.

What is claimed is:

1. A switch comprising a base plate having a shaft portion mounted thereon and carrying a plurality of stator contacts arcuately disposed with respect to said shaft and having an arcuate slot between said contacts and shaft portion, a circular sleeve rotatably disposed around said shaft on the side of the plate remote from said contacts, and a spring rotor carried by said sleeve threaded through said slot and cooperating with said contacts.

2. A switch comprising a base plate having a shaft portion extending therefrom and carrying a plurality of stator contacts on the side remote from said shaft side and having a slot between said contacts and shaft, a sleeve rotatably disposed around said shaft, and a spring rotor contact carried by said sleeve and threaded through said slot for engaging said stator contacts, said rotor contact being sprung downwardly against the stator contact supporting portion.

3. A switch comprising a base plate having a shaft extending from one side thereof and carrying a plurality of stator contacts on the other side thereof on the arc of a circle concentric with said shaft and having an arcuate slot between said contacts and shaft, each of said contacts comprising a pair of opposed jaws adapted to open perpendicular to the mounting plate, a sleeve rotatably disposed around said shaft and a rotor contact carried by said sleeve threaded through said slot and engaging said stator contacts.

4. The switch of claim 3 wherein said plate is provided with apertures in which the lower stator contact jaws are disposed and wherein the rotor contact is spring biased downwardly against said plate.

5. The switch of claim 2 wherein said plate is provided with at least one index indentation and said rotor contact has a spring portion cooperating with said index indentation for indexing purposes.

6. A switch comprising a metal base plate having a shaft portion extending downwardly therefrom on one side, an insulating stator plate carrying a plurality of stator contacts disposed on said plate, said contacts being disposed on the arc of a circle concentric with said shaft, said plate and insulating stator being shaped to provide an arcuate slot between said contacts and said shaft portion, a sleeve rotatably disposed around said shaft and being free to move in all directions, and a rotor contact carried by said sleeve threaded through said slot and cooperating with said stator contacts and adapted to maintain said sleeve in position.

7. The switch of claim 6 wherein said rotor contact is spring biased downwardly against the insulating stator member.

8. The switch of claim 6 wherein said stator member has a plurality of apertures and wherein said stator contacts have opposing jaws adapted to open perpendicular to the plane of said stator with the lower jaw of each in said aperture and wherein said rotor contact is wider than any one of said apertures and is spring biased downwardly against the insulating stator.

9. The switch of claim 6 wherein said metal plate is provided with at least one index indentation and wherein said rotor contact has a spring portion cooperating with said indentation for index purposes.

10. A switch comprising a metal base plate having a shaft portion extending from one side thereof, an insulating stator mounted on the other side of said base plate and carrying a plurality of spring contacts, each contact having opposing spring jaws adapted to open perpendicular to said stator plate with said stator plate apertured to permit the lower jaw to rest below the surface of said stator plate, said stator plate and base plate being so shaped as to provide a slot between said shaft and contacts, said base plate having at least one index indentation, a sleeve rotatably disposed around said shaft, and a spring member carried by said sleeve having one portion cooperating with said index indentations and having a contact finger threaded through said slot and engaging said stator contacts.

11. The switch of claim 10 wherein said contact making portion attached to the sleeve is spring biased downwardly against the insulating stator and is wide enough so that it rests against said insulating stator in all positions.

12. The switch of claim 10 wherein said shaft is a hollow member.

EDWARD J. MASTNEY.